United States Patent
Beye (10) Patent No.: US 11,605,068 B2
(45) Date of Patent: Mar. 14, 2023

(54) MOBILE ELECTRONIC WALLET SYSTEM

(71) Applicant: Bank of America Corporation, Charlotte, NC (US)

(72) Inventor: Rick A. Beye, Lambertville, NJ (US)

(73) Assignee: Bank of America Corporation, Charlotte, NC (US)

( * ) Notice: Subject to any disclaimer, the term of this patent is extended or adjusted under 35 U.S.C. 154(b) by 183 days.

(21) Appl. No.: 16/441,331

(22) Filed: Jun. 14, 2019

(65) Prior Publication Data
US 2020/0394646 A1    Dec. 17, 2020

(51) Int. Cl.
G06Q 20/36    (2012.01)
G06Q 20/32    (2012.01)

(52) U.S. Cl.
CPC ..... *G06Q 20/3674* (2013.01); *G06Q 20/3224* (2013.01); *G06Q 2220/00* (2013.01)

(58) Field of Classification Search
CPC .......... G06Q 20/3674; G06Q 20/3224; G06Q 2220/00; G06Q 20/4015; G06Q 20/405; G06Q 20/20
See application file for complete search history.

(56) References Cited

U.S. PATENT DOCUMENTS

| | | | |
|---|---|---|---|
| 8,243,596 B2 | 8/2012 | Fedders et al. | |
| 8,244,874 B1 | 8/2012 | Thireault | |
| 8,548,426 B2 * | 10/2013 | Smith | G06Q 20/322 455/406 |
| 9,785,930 B1 * | 10/2017 | Terra | G06Q 20/352 |
| 9,900,725 B2 | 2/2018 | Young et al. | |
| 10,706,414 B1 * | 7/2020 | Lieberman | G06Q 20/4016 |
| 11,494,782 B1 * | 11/2022 | Jacoby | G06Q 20/3574 |
| 2008/0033880 A1 * | 2/2008 | Fiebiger | G06Q 20/40 705/44 |
| 2008/0126145 A1 * | 5/2008 | Rackley, III | G06Q 20/102 455/406 |
| 2010/0138344 A1 * | 6/2010 | Wong | G06Q 20/10 705/44 |
| 2012/0094639 A1 * | 4/2012 | Carlson | H04W 4/029 455/414.1 |

(Continued)

OTHER PUBLICATIONS

Megan Geuss, "How Apple Pay and Google Wallet Actually Work," https://arstechnica.com/gadgets/2014/10/how-mobile-payments-really-work/, Oct. 29, 2014.

(Continued)

*Primary Examiner* — Patrick McAtee
*Assistant Examiner* — Vincent I Idiake
(74) *Attorney, Agent, or Firm* — Weiss & Arons LLP (57) ABSTRACT

Apparatus and methods for securing mobile payments during periods when network connections to a cloud computing environment are unavailable are provided. A mobile device may store one or more transaction maps. The transaction maps may include limitations on where offline payment requests may occur and be approved. Limitations may include monetary limitations on a value of an offline payment request. The mobile device may include a secure location for storing the one or more transaction maps. A transaction map may define one or more logical transaction zone. A logical transaction zone may define geographic limits on offline payment requests.

19 Claims, 7 Drawing Sheets

(56) References Cited

U.S. PATENT DOCUMENTS

| | | | | |
|---|---|---|---|---|
| 2013/0046692 | A1* | 2/2013 | Grigg | G06Q 20/4016 |
| | | | | 705/44 |
| 2014/0337216 | A1* | 11/2014 | Anand | G06Q 20/32 |
| | | | | 705/44 |
| 2018/0121891 | A1* | 5/2018 | Hosny | G06Q 20/027 |
| 2018/0167445 | A1 | 6/2018 | Speight et al. | |
| 2018/0367314 | A1 | 12/2018 | Egner et al. | |
| 2019/0026450 | A1 | 1/2019 | Egner et al. | |
| 2020/0302433 | A1* | 9/2020 | Green | G06Q 20/102 |
| 2021/0027295 | A1* | 1/2021 | Raquepaw | G07F 19/206 |
| 2021/0042724 | A1* | 2/2021 | Rathod | G06Q 30/06 |

OTHER PUBLICATIONS

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://wwwtheverge.com/circuitbreaker/2018/5/7/17327584/edge-computing-clond-google, May 7, 2018.

Ellen Cunningham, "Digital Wallets: Intro to Apple Pay, Google Pay, Chase Pay, and More," https://www.cardfellow.com/blog/digital-wallets-apple-pay-samsung-pay-paypal, Cardfellow, Retrieved on May 2, 2019.

Ellen Cunningham, "Introduction to Apple Pay," https://www.cardfellow.com/blog/introduction-to-apple-pay/, CardFellow, Retrieved on May 2, 2019.

"How to Accept Apple Pay at Your Small Business," https://squareup.com/townsquare/apple-apy-for-small-businesses-how-to-accept-it, Square, Inc., Retrieved on May 2, 2019.

"What is Edge Computing," https://www.ge.com/digital/blog/what-edge-computing, GE Digital, Retrieved on May 16, 2019.

* cited by examiner

Row 201:
| PRODUCT ID | LOCATION | TIME | DATE | AMOUNT | NUMBER OF ITEMS | TRANSACTION ZONE | ADDRESS | CHECKOUT NO. | PAYMENT INSTRUMENT TYPE | MCC |
|---|---|---|---|---|---|---|---|---|---|---|
| 203 | 204 | 206 | 208 | 210 | 212 | 214 | 216 | 218 | 220 | 222 |

| TRANSACTION VOLUME | TOTAL SALES | TRANSACTION FREQUENCY | AVERAGE TRANSACTION AMOUNT | CREDIT RISK |
|---|---|---|---|---|
| 221 | 223 | 229 | 235 | 237 |

MOBILE ELECTRONIC WALLET SYSTEM

FIELD OF TECHNOLOGY

This application describes apparatus and methods for securing mobile payments during periods when network connections to a cloud computing environment are unavailable.

BACKGROUND

Typically, a customer may provide an electronic payment to a merchant. The electronic payment may be a transaction that includes a payment request to transfer an amount of funds to the merchant. In exchange for receiving the funds, the merchant may release desired goods/services (collectively, "goods") to the customer.

A point-of-sale ("POS") system at the merchant may receive the electronic payment from the customer. The POS system may submit the electronic payment to a cloud computing environment for authorization. As part of the authorization process, the cloud computing environment may determine whether the customer has a sufficient cash balance in an account to cover an amount of the electronic payment. The cloud computing environment may determine whether the customer has an available line-of-credit to cover an amount of the electronic payment. The authorization process may include security and fraud detection analyses. The cloud computing environment may provide access to relevant data needed to conduct the security and fraud detection analyses.

Although the cloud computing environment may be a robust and resilient system, communication failures between the customer and cloud computing environment or POS system and cloud computing environment may prevent the electronic payment from being timely received by the cloud computing environment. For example, the POS system may transfer an electronic payment to the cloud computing environment using telecommunication equipment. A natural disaster may damage the equipment, preventing the POS system from communicating with the cloud computing environment. The telecommunication equipment may fail, cutting off access to the cloud computing environment.

Typically, when a customer device or POS system cannot communicate with the cloud computing environment, an electronic payment will not be authorized. By default, the POS system may be configured to generate a denial of the electronic payment if communication with the cloud computing system is unavailable. When the electronic payment is denied, the merchant may not release the goods to the customer. The customer will need to return to the merchant another time to obtain the goods.

Aside from customer inconvenience, goods sold by the merchant may be needed by the customer within a predetermined time window. For example, the customer may need fuel for a vehicle or medicine for a family member. It would be desirable to provide apparatus and methods that overcome communication failures that may generate a denial of a payment request. It would further be desirable to provide apparatus and methods that solve technical challenges of network models that route electronic payments to a cloud computing environment. Accordingly, it would be desirable to provide a resilient mobile electronic wallet system that is immune to telecommunication failures that sever connections to a cloud computing environment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for a mobile electronic wallet system are provided. The system may implement dynamic transactional mapping. Transactional mapping may allow a customer and merchant to authorize an electronic payment while disconnected from a cloud computing environment. Electronic payments that are not forwarded to the cloud computing environment may be referred to herein as "offline" payments. The system may utilize a mobile device of the customer. The customer's mobile device may be utilized to provide processing power and logic that runs security and fraud detection routines for offline payments.

A transaction map may define one or more payment attributes. Limits for an offline payment may be derived from payment attributes defined in a transaction map. Limits may include monetary limitations on a value of an offline payment. Limits may include locations we expect the customer to be, amounts the customer typically spends, goods the customer typically buys and merchants the customer typically patronizes. Offline payments associated that exceed a limit may be denied. Offline payments associated that do not exceed a limit may be approved.

Limits may be determined based on the attributes. For example, a geographic relationship among payment attributes may be derived and mapped to define a logical payment zone. A payment zone may define limits for offline payments within the zone.

Illustrative attributes may include location data. Location data may include a location of the customer's mobile device when initiating an electronic payment (online or offline). The location data may be a location of a merchant holding the goods that are to be exchanged upon successful authorization of an electronic payment. Location data may include a location of the POS system. Location data may include any suitable combination of customer and merchant locations. Location data may include global positioning system ("GPS") coordinates associated with historical (online or offline) electronic payments. Such GPS coordinates may include locations of prior sales and nearby landmarks.

Attributes may include device identifiers associated with a merchant POS system. Attributes may include device identifiers associated with a customer's device. The attributes may define transaction behavior of a customer. Attributes may include a number of times the customer has visited a particular merchant location.

Attributes may include timing associated with one or more electronic payments. Timing may include a time/date stamp of an electronic payment. Timing may include a time window associated with a series of electronic payments. Attributes may include relationships linking electronic payments. Electronic payments may be related based on classification of goods, location, price, frequency of purchase, merchant or any other suitable attribute or combination thereof.

Table 1 below shows illustrative payment attributes and associated values.

TABLE 1

Illustrative payment attributes and associated values.

| Illustrative Transaction Attributes | Illustrative Associated Value |
|---|---|
| Geographic | Longitude/latitude |
| | GPS coordinates |
| | Map coordinates |
| | Elevation |
| | Depth |
| | Distance from a point |
| | Home address |
| | Work address |
| | Typical transit pathway |
| | Zip code |
| | Area code |
| | County |
| | State |
| | Country |
| | IP address |
| | Signal triangulation location |
| Temporal | Seconds |
| | Minutes |
| | Hours |
| | Day |
| | Week |
| | Month |
| | Year |
| | Duration |
| | Purchase frequency |
| Synoptic | Correlation among two or more attributes |
| | Logical explanation for outlier purchase (e.g., weather, time of year, current events, ect . . .) |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| Merchant category code | Numerical identifier |
| | Taxation status |
| | Type of goods sold |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |
| | Airport kiosk |
| | Brick and mortar location |

The attributes and associated limits may be embodied in one or more transaction maps. A merchant POS system may store attributes for processing offline payments. A customer's mobile device may store attributes for processing offline payments. The mobile device may include a secure location for storing the one or more transaction maps. The mobile device may store limits on where offline payments may occur and be authorized. In some embodiments, the mobile device may be configured to derive limits in real time based on attributes stored locally on the mobile device.

Payment attributes and associated limits embodied in a transaction map may be determined by machine learning. A machine learning algorithm may define limits based on data stored on the cloud computing environment. Machine learning algorithms may define limits based on attributes associated with prior transactions.

A transaction map may define a "known" logical payment zone. When the customer is operating in the known zone, offline payments may be authorized with fewer limits relative to other zones. An illustrative known zone may be defined by a pre-determined distance from a known location, such as a customer's home or work.

A transaction map may define an "unknown zone." When the customer is operating in an unknown zone, offline payments may be subject to more limitations than offline payments initiated in known zones. For example, in an unknown zone, offline payments may be limited to specific purchase amounts per transaction. In an unknown zone, only offline payments associated with relatively low cost, high frequency staple goods (e.g. coffee, fuel, groceries) may be authorized. When operating in an unknown zone, historical attributes associated with a known zone may be utilized to define low cost, high frequency staple goods, independent of geographic location.

A transaction map may define a stationary zone. A stationary zone may be centered on areas frequently visited by the customer. A transaction map may define a transitive zone. A transitive zone may be utilized when the customer is in transit. The transitive zone may include attributes and associated logic for authorizing offline payments at or near locations or merchants associated with public transportation, commuter train, airport terminals, in flight or any other suitable mode of transportation.

A merchant may be associated with a chain of stores in different locations. If the customer has utilized one of the merchant locations, a transaction map may include coordinates of one or more of the other merchant locations even if those other locations have not been visited by the customer. The transaction map may authorize offline electronic payment at the other merchant locations.

Based on the location and identify of a merchant, machine learning algorithms may classify goods purchased from the merchant. Goods may be classified based on a merchant category code ("MCC") associated with the merchant. The classification of goods may be an attribute that provides a basis for authorizing offline payments for similarly categorized goods.

When a communication pathway is established with a cloud computing environment, transaction maps stored locally on a customer mobile device or merchant POS system may be updated. A transaction map may be updated based on data associated with the cloud computing environment. For example, a customer may travel outside boundaries associated with a first transaction map. A second transaction map that includes attributes captured in the new location may be pushed to the mobile device.

Each transaction map may be stored (on the mobile device or merchant POS system) as an encrypted "data island." A collection of transaction maps stored on a device may be updated when the device is connected to the cloud computing environment. Transaction maps may be dynamically updated as the mobile device moves from location to location.

One or more transaction maps may be pushed to a device based on expected movement of the customer. For example, the customer may have a different schedule on weekends than on weekdays. A first transaction map for use on weekends may be pushed to the customer's mobile device. A second transaction map for use on weekdays may be pushed to the mobile device. Transaction maps stored on the mobile device and associated limits may be utilized to authorize offline payments when a communication pathway cannot be established with the cloud computing environment.

Each transaction map may include attributes and associated limits that are unique to each customer. Distributing and dynamically maintaining transaction maps may allow for offline payments to be authorized independent of connectivity to the cloud computing environment. Thus, despite being unable to ascertain a customer's real-time account balance or available line-of-credit, offline payments may be authorized based on a transaction map stored locally on the customer's mobile device. Payment attributes such as location and time may be utilized to determine which transaction map to apply to a specific offline payment. Payment attributes and limits of a transaction map may be utilized to determine whether to authorize the offline payment.

Apparatus for a mobile electronic wallet system is provided. Apparatus may include a cloud computing environment. The cloud computing environment may be configured to receive a payment request to debit a customer account. The cloud computing environment may be configured to authorize the payment request submitted to the cloud computing environment. The payment requests may be submitted by a customer. The payment request may be submitted by a merchant. The payment request may be submitted by a mobile device. The payment request may be submitted by a terminal or other component of a merchant POS system.

In response to receiving the payment request, the cloud computing environment may process the payment request. Processing may include evaluating whether the payment request should be authorized. Processing may include evaluating whether a customer account is associated with sufficient funds or available credit to cover the payment request. The cloud computing environment may debit the customer account or reduce a line of credit available to the customer.

Apparatus may include a mobile device. The mobile device may be configured to initiate the payment request. The mobile device may be configured to submit the payment request to the cloud computing environment. The mobile device may be operated by the customer. The mobile device may be operated by the merchant.

Apparatus may include an application running on the mobile device. The application may be configured to receive a transaction map. The application may receive the transaction map from the cloud computing environment. The application may be configured to store the transaction map. The application may be configured to encrypt the transaction map. In some embodiments, the transaction map may be encrypted before it is received by the application.

The cloud computing environment may generate the transaction map. The cloud computing environment may push the transaction map to the mobile device. In some embodiments, the application running on the mobile device may request that the cloud computing environment generate and transmit the transaction map. The application may store the transaction map locally on the mobile device.

The transaction map may be generated based on historical payment requests received by the cloud computing environment. The transaction map may be generated based on authorization decisions of payment requests received by the cloud computing environment. The transaction map may be generated based on historical payment requests authorized by the cloud computing environment. The transaction map may be generated based on historical payment requests denied by the cloud computing environment. The transaction map may be generated based on payment attributes associated with payment requests and authorization decisions.

The transaction map may be generated based on historical payment requests, authorization decisions and payment attributes associated with a target geographical location. The target geographical location may be a predefined distance (e.g., a radial distance) from a customer address. The customer address may be associated with one or more payment instruments stored on the mobile device.

Non-geographic transaction maps may also be generated based on historical payment requests and associated payment attributes. For example, apparatus may generate one or more transaction maps based on one or more payment attributes (or combinations thereof) shown above in Table 1. For example, a time-transaction map may be generated based on payment requests received by the cloud computing environment within a predetermined interval. Illustrative intervals may include a day, week or specified hours.

A transaction map may be generated based on any suitable combination of payment attributes. For example, a transaction map may be generated based on payment requests initiated by the customer for a particular MCC and for less than, or equal to, a specified amount.

The application may be configured to determine whether the mobile device is able to establish a communication link with the cloud computing environment. The communication link may include a cellular data connection, Wi-Fi, Bluetooth or any suitable connection for transferring data to the cloud computing environment.

When the application detects that the mobile device is able to establish the communication link, the application may be configured to transmit the payment request to the cloud computing environment for processing. In some embodiments, when the communication link to the cloud computing environment is available, the customer's mobile device may allow the merchant's POS system to submit the payment request to the cloud computing environment for processing.

When a communication link to the cloud computing environment is successfully established, the processing of the payment request may be delegated to the cloud computing environment. After the payment request is transmitted to the cloud computing environment, the application may wait to receive an authorization decision from the cloud computing environment.

If the cloud computing environment authorizes the payment request, the merchant POS system may release goods to the customer. If the cloud computing environment denies or otherwise does not authorize the payment request, the goods may not be released by the merchant POS system.

The application or merchant POS system may be unable to establish a communication link to the cloud computing environment. The communication link may not be established because of an infrastructure failure. For example, a natural disaster may damage telecommunication equipment. The communication link to the cloud computing environment may not be established for any suitable reason. For example, due to excessive use, bandwidth or processing power may not be available to transmit the payment request to the cloud computing environment.

The application may determine that the communication link cannot be established. In some embodiments, the application may receive notification from the merchant POS system that the communication link to the cloud computing environment has not been established. The application and/or merchant POS system may determine that the communication link cannot be established when the communication link cannot be established within a predetermined time window.

When the communication link cannot be established, the application may be configured to determine that the payment request is an offline payment. The application may be configured to evaluate the offline payment request based on one or more transaction maps stored locally on the mobile device. The application may be configured to authorize the offline payment request based on a locally stored transaction map.

For example, a transaction map may indicate the offline payment is associated with an MCC frequented (e.g., a threshold number of times) by the customer. The transaction map may indicate that an offline payment is associated with a merchant location that has been the subject of a prior electronic payment. The transaction map may indicate that a purchase amount of the offline payment is within a threshold tolerance of amounts of prior payment requests associated with the merchant location.

Based on the transaction map, the application may determine that an offline payment is within a "comfort" or "known" zone. The application may authorize offline payments that are within the known zone. A known zone may include a customer or merchant location that is within a predetermined transaction zone. The predetermined transaction zone may be stored in a transaction map on the mobile device.

The application may be unable to communicate with the cloud computing environment and access a real-time status of the customer's account balance or line-of-credit. The application may authorize an offline payment anyway when the offline payment includes attributes that "fit" into a pattern of attributes include in a transaction map.

For example, a transaction map may indicate the customer has conducted a threshold number of electronic payments within a predetermined distance from a location. The transaction map may indicate that the customer has conducted electronic payments at a merchant (identified by location or MCC). The offline payment may be authorized if it includes attributes corresponding to the predetermined location and the merchant. In response to authorizing the offline payment, a merchant POS system may be instructed to release goods that are the subject of the offline payment.

The application may log authorizations of offline payments. The application may be configured to authorize an offline payment when a value of the offline payment is within a predetermined range of values included in a transaction map.

The application may be configured to authorize a plurality of offline payment based on the transaction map. The plurality of offline payments may be associated with an aggregate value less than a predetermined value. For example, despite being unable to communicate with the cloud computing environment, the application may authorize offline payments that are each below a predetermined value.

The application may continue to authorize offline payments despite being unable to communicate with the cloud computing environment until an aggregate value of the authorized offline payments meets or exceeds a predetermined threshold value. When the mobile device reestablishes communication with the cloud computing environment, the application may transfer the plurality of processed (e.g., authorized or denied) offline payments to the cloud computing environment.

The cloud computing environment may reconcile or otherwise integrate the plurality of processed offline payments with a central ledger accessible by the cloud computing environment. Upon receiving processed offline payments, the cloud computing environment may adjust an account balance or line of credit available to the customer. The application may be configured to reset the aggregate value when the mobile device establishes that a communication link to the cloud computing environment is available.

The application may be configured to determine that the mobile device is outside a geographic zone of a transaction map stored locally on the mobile device. The application may evaluate and authorize an offline payment based on correlating payment attributes of the offline payment and payment attributes associated with the available transaction map.

For example, the application may identify a merchant associated with the offline payment and a value of the offline payment. The merchant and the value may be within a comfort zone associated with the transaction map. The application may authorize the offline payment based on the merchant identity and value, despite being associated with a location outside the comfort zone.

Methods for securing a payment request are provided. The payment request may be initiated by a mobile device. The mobile device may initiate the payment request as part of a check-out procedure when purchasing goods from a merchant. The payment request may include transmitting one or more payment request attributes (e.g., amount, goods and payment instrument) to a POS system of the merchant. The merchant POS system may attempt to transmit the attributes to a cloud computing environment for processing. In some embodiments, the mobile device may attempt to transmit the attributes to a cloud computing environment.

Methods may include determining whether a communication link or other network connectivity with the cloud computing environment is available. The mobile device may be configured to determine if a communication link is successfully established. The mobile device may be configured to determine whether the merchant POS system has been able to establish a connection to the cloud computing environment. The merchant POS system may be configured to communicate to the mobile device whether the communication link has been established.

When the communication link is successfully established, methods may include offloading processing of the payment request to the cloud computing environment. Methods may include using the established communication link, downloading a transaction map. Methods may include storing the transaction map locally on the mobile device.

The transaction map may be formulated by the cloud computing environment. The transaction map may be formulated based on payment requests processed by the cloud computing environment. The transaction map may be formulated based on a subset of payment requests processed by the cloud computing environment. The subset may be determined based on common or related payment attributes associated with a plurality of payment requests.

When the mobile device is unable to establish the communication link, methods may include processing the now offline payment based on a locally stored transaction map. Processing the offline payment request based on the transaction map may include determining a correlation between attributes of the offline payment and payment attributes associated with the transaction map.

For example, if an offline payment includes a threshold number of payment attributes in common with payment attributes associated with the transaction map, the mobile device may authorize the offline payment despite having no communication with the cloud computing environment. Such "offline" authorization of a payment request may provide the customers and merchants with a seamless workflow despite infrastructure failures or failures of communication systems.

For example, methods may secure offline payments during a natural disaster. Methods may allow a customer to continue making payments and obtaining desired goods from a merchant during the natural disaster despite disruptions or damage to telecommunication systems.

In some embodiments, a merchant POS system may utilize services of a customer's mobile device. For example, a merchant POS system may be unable to communicate with a cloud computing environment. An application on the customer's mobile device may be configured to communicate with the merchant's POS system. The mobile device may determine that the merchant POS system is unable to access the cloud computing environment.

In response to determining that the merchant POS system is unable to access the cloud computing environment, the customer's mobile device may attempt to establish the communication link to the cloud computing environment. If the mobile device is able to submit a payment request to the cloud computing environment for processing, the mobile device may wait to receive an authorization decision from the cloud computing environment.

When the mobile device receives an authorization decision from the cloud computing environment, the mobile device may communicate the authorization decision to the merchant POS system. In response to receiving the authorization decision, the merchant POS system may release goods to the customer.

The authorization decision of the cloud computing environment may be digitally signed or otherwise indicate it has been generated by the cloud computing environment. For example, the authorization decision may be stored in a distributed ledger. The cloud computing environment may be required to approve recordation of the authorization decision in the distributed ledger.

The mobile device may not be able to establish a network connection to the cloud computing environment. The mobile device may be configured to authorize the now offline payment based on a transaction map stored locally on the mobile device. The mobile device may communicate to the merchant POS system that the offline payment request has been authorized by the mobile device. In response to receiving the authorization from the mobile device, the merchant POS system may release goods to the customer.

When the mobile device is able to establish a communication link to the cloud computing environment, methods may include updating a transaction map. The transaction map may be updated based on a current geographic location of the mobile device. For example, the customer may travel to different city or country.

Methods may include updating the transaction map based on payment attributes associated with the new location. For example, the updated transaction map may identify merchants within the new location typically associated with high frequency, low value purchases made the customer in other locations. Illustrative high frequency, low value purchases may include coffee vendors, fast food chains, convenience stores, fueling stations and the like. Offline payments at merchants that provide such goods may be authorized by the mobile device without any historical purchase history associated with the specific merchant location.

In some embodiments, an updated transaction map may include merchant locations that offer goods analogous to goods offered by merchants associated with prior versions of the transaction map. For example, a first version of a transaction map may include a threshold number of purchases at art supply stores. When the customer moves to a new location, the specific merchant associated with the prior art supply purchases may not have any stores in the new location. Methods may include determining purveyors of art supplies that have stores in the new location. Methods may include authorizing purchases at the new merchant based on payment attributes (e.g., amount or type of goods purchased) of prior art supply purchases.

Processing an offline payment based on a transaction map may include identifying a merchant associated with the offline payment. Methods may include determining whether attributes of the transaction map include the identified merchant. Methods may include authorizing an offline payment when the transaction map includes the identified merchant. When the identified merchant is not included in the transaction map, methods may include authorizing the offline payment when the identified merchant provides a high-frequency staple good and an amount associated with the offline payment request is less than a limit associated with the high-frequency staple good.

A high-frequency staple good may be determined based on a threshold number of attributes included in a transaction map. Methods may include determining the high frequency staple good based on a listing of merchants provided when the mobile device connects to the cloud computing environment. The cloud computing environment may collate a list of merchants associated with high frequency staple goods based on attributes of payment requests received from multiple customers and/or merchants. Methods may include storing a listing of merchants associated with high frequency staple goods locally on the mobile device.

When the mobile device is unable to connect to the cloud computing environment for a predetermined amount of time, methods may include suspending authorizations based on a transaction map. For example, if the mobile device in unable to communicate with the cloud computing environment for two weeks, authorizations of offline payments based on the transaction map may be suspended. In some embodiments, when an aggregate value of offline payments authorized based on a transaction map exceeds a predetermined value, methods may include suspending further authorizations based on the transaction map.

A suspension of authorizations based on the transaction map may be removed. For example, when a natural disaster is having a prolonged impact on a location, a message may be transmitted to the mobile device. The message may configure the mobile device to continue authorizing offline payments for specific merchants. Such merchants may include pharmacies, grocery stores or other merchants that sell staple goods.

Apparatus for a mobile electronic wallet system is provided. The system may include a cloud computing environment. The cloud computing environment may be configured to receive and authorize a payment request. The payment request may be initiated by a customer using a mobile device. The payment request may be initiated by submitting information stored on a payment instrument to a merchant POS system. The merchant POS system may submit the payment request to the cloud computing environment for processing. The merchant POS system may release goods to the customer in response to receiving notification that the payment request has been authorized.

The system may include a software application. The software application may be run on a customer's mobile device. The application may be configured to determine whether the cloud computing environment is accessible. The application may determine whether the cloud computing environment is accessible by trying to establish a communication link to the cloud computing environment. The application may try to establish the communication link using hardware and data connectivity provided by the mobile device. The application may try to establish the communication link using hardware and data connectivity provided by a merchant POS system.

When the cloud computing environment is accessible, the system may be configured to allow the cloud computing environment to process the payment request. When the cloud computing environment is not accessible, the system may be configured to authorize an offline payment based on a transaction map stored locally on the mobile device.

The transaction map may be generated based on attributes of historical payment requests initiated by the mobile device. For example, geographic boundaries of the transaction map may be generated based on GPS coordinates of the mobile device when initiating one or more of the historical payment requests.

The software application may be configured to impose a time limit on offline payments. After expiration of a predetermined interval, no further offline payments may be authorized. The software application may be further configured to update the transaction map. The transaction map may be updated based on a current location of the mobile device. An update may correlate a first group of merchants and associated purchase requests in a first location to a second group of merchants in a second location. The correlating may link attributes, such as type of goods/services provided by the first group of merchants, to a type of goods/services provided by the second group of merchants.

For example, although the first group of merchants may not have brick and mortar stores in the second location, the system may identify a second group of merchant that do have brick and mortar stores in the second location and sell goods/services analogous (e.g., based on MCC category) to those sold by the first group. Based on the updated transaction map, the system may authorize an offline payment associated with the second group of merchants based on attributes associated with payment requests of the first group of merchants. The updated transaction map may apply the attributes associated with the first group of merchants to the second group of merchants.

The software application may be configured to harden authorization of an online payment request authorized by the cloud computing environment. The application may harden the authorized payment request by ascertaining whether the online payment request would have been authorized based on a locally stored transaction map.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
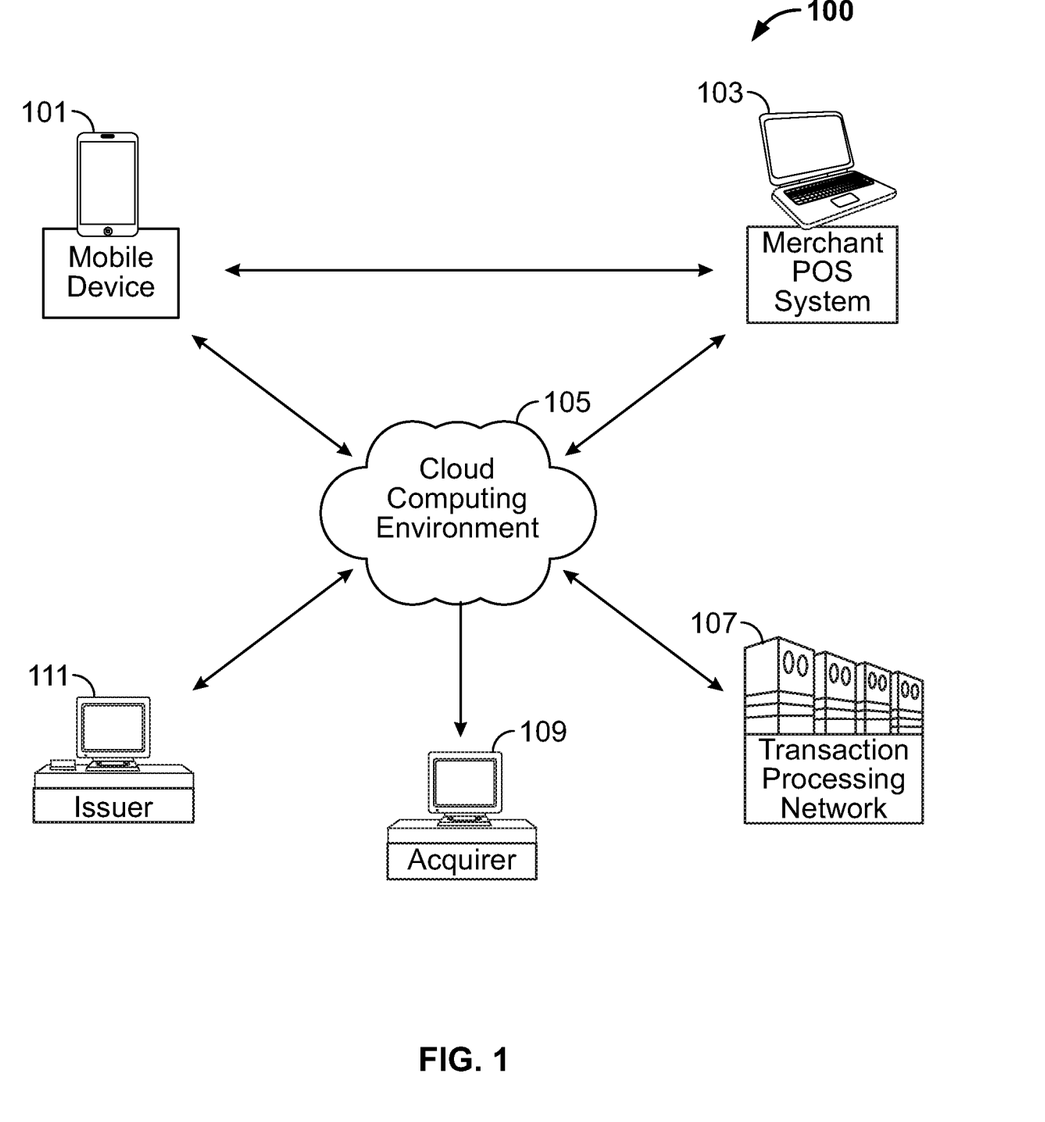
FIG. 1 shows an illustrative system architecture in accordance with principles of the disclosure.

FIG. 1 shows illustrative system architecture 100. System 100 includes cloud computing environment 105. Cloud computing environment 105 may receive a payment request to debit a customer account or line-of-credit. The payment request may be submitted by mobile device 101. The payment request may be submitted by merchant POS system 103.

In an electronic payment that includes a payment request, a customer may purchase goods or services from a merchant. The customer may wish to pay the merchant using a payment instrument issued by issuer 111. The merchant may present the electronic payment and information associated with the payment instrument to acquiring bank ("acquirer") 109.

Acquirer 109 pays the merchant an amount authorized by issuer 111. Transaction processing network 107 may be in communication with issuer 111 and acquirer 109. Transaction processing network 107 may settle funds between issuer 111 and acquirer 109.

Cloud computing environment 105 may store attributes generated by one or more transactions participants. Transaction participants may include mobile device 101, issuer 111, acquirer 109, transaction processing network 107 and/or merchant POS system 103.

Cloud computing environment 105 may be configured to process an electronic payment and associated payment request. Processing an electronic payment may include providing services typically provided by issuer 111, acquirer 109 or transaction processing network 107. Processing a payment request may include determining whether a customer has sufficient available credit or cash balance for the amount of the electronic payment. Cloud computing environment 105 may submit an electronic payment for sub-processing to issuer 111, acquirer 109 or transaction processing network 107.

Figure 2:
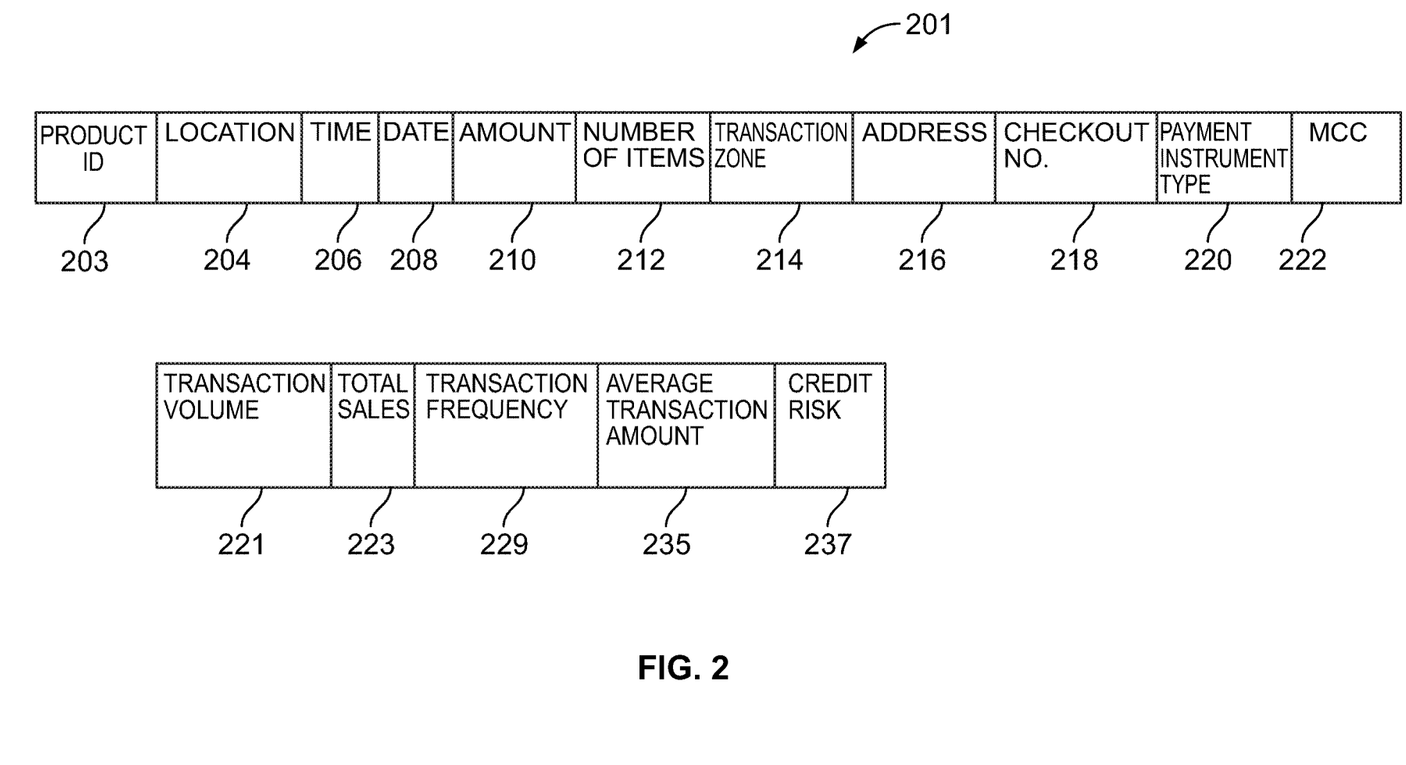
FIG. 2 shows an illustrative electronic payment attributes in accordance with principles of the disclosure.

FIG. 2 shows illustrative electronic payment attributes 201. An application running on mobile device 101 (shown in FIG. 1) may be configured to store a transaction map. Merchant POS system 103 may be configured to store a transaction map. Any other transaction participant system (shown in FIG. 1) may store a transaction map. The transaction map may include attributes 201. Attributes 201 may be utilized to authorize a payment request when transaction participant systems are unable to communicate with each other or cloud computing environment 105.

A transaction map may be generated based on electronic payment attributes associated with historical payment requests. Electronic attributes associated with historical payment requests may be logged by cloud computing environment 105 or any other suitable transaction participant system.

Electronic payment attributes 201 include product identifier 203. Product identifier 203 may identify a product purchased by a customer. Product identifier 203 may identify a plurality of products purchased by a customer. A product may be identified by a stock keeping unit ("SKU"), bar code or any other suitable descriptor.

Electronic payment attributes 201 include location 204. Location 204 may indicate a location of a payment request. For example, a customer may initiate a payment request using mobile device 101 (shown in FIG. 1). Mobile device 101 may include a sensor that tracks a location (e.g., GPS coordinates) of the mobile device when the payment request is initiated. Cloud computing environment 105 may log a location associated with each payment request initiated using mobile device 101. Location 204 may be a location of merchant POS system 103.

Electronic payment attributes 201 include time 206. Time 206 may be when a customer initiates a payment request. Time 206 may be provided by merchant POS system 103 or any other transaction participant shown in FIG. 1. For example, time 206 may be when issuer 111 authorizes a payment request or when transaction processing network 107 settles a payment request.

Electronic payment attributes 201 include date 208. Date 208 may be a date stamp associated with a customer initiation of a payment request. Date 208 may be a date provided by merchant POS system 103 or any other transaction participant.

Electronic payment attributes 201 include amount 210. Amount 210 may be a purchase value of goods associated with a payment request. Amount 210 may be an amount authorized by issuer 111. Amount 210 may be an amount charged by transaction processing network 107, issuer 111 or acquirer 109.

Electronic payment attributes 201 include number of items 212. Number of items 212 may correspond to a number of items (e.g., goods) purchased by a customer in an electronic payment.

Electronic payment attributes 201 include transaction zone 214. Transaction zone 214 may represent a boundary that radiates a defined distance from location 204 or address 216. Address 216 may be known address associated with a customer or merchant. Illustrative example of address 216 may include a customer's home or work address and an address of a merchant retail location. An application running on mobile device 101 may be configured to authorize the payment request based on a location of mobile device 101 being within the transaction zone.

Electronic payment attributes 201 include checkout number 218. A merchant POS system may assign different identifiers to different access channels. Illustrative access channels may include online purchases, purchases at brick and mortar locations or purchases from third party resellers. Checkout number 218 may indicate a specific access channel.

Electronic payment attributes 201 include payment instrument type 220. Payment instrument type 220 may correspond to the payment instrument (e.g., credit card, debit card, check mobile payment) utilized by a customer to pay for goods at merchant POS system 103.

Electronic payment attributes 201 include MCC 222. MCC 222 may group merchants that supply similar goods. MCC 222 may provide a recognized description of goods purchased in an electronic payment.

Electronic payment attributes 201 include attributes that may be determined based on prior electronic payments and requests. For example, electronic payment attributes 201 include transaction volume 221 and total sales 223. These attributes may be determined based on prior payment requests associated with a particular transaction participant, customer, payment instrument or access channel.

Electronic payment attributes 201 include transaction frequency 229. Transaction frequency 229 may indicate how often a customer purchases particular goods, at a particular time, for a particular amount or any suitable combination of payment attributes.

Electronic payment attributes 201 include average transaction amount 235. Average transaction amount 235 may be calculated for a plurality of payment requests. For example, each payment request that includes a particular location, such as purchases made at location X during morning hours are associated with average transaction amount 235. Average transaction amount 235 may be appended to each payment request that includes attributes corresponding to location X and/or time 206 corresponding to morning hours.

Electronic payment attributes 201 include credit risk 237. A transaction participant (shown in FIG. 1) may associate each payment request with estimated credit risk 237. Credit risk 237 may be calculated for each payment request.

A transaction map may include one or more of attributes 201. A transaction map may correlate one or more of attributes 201. For example, a transaction map may be used to authorize an offline payment request based on location 204 being within transaction zone 214 and credit risk 237 below a threshold. A transaction map may be used to authorize an offline payment request based on amount 210 being within a predetermined range of average transaction amount 235.

A transaction map may be used to authorize an offline payment request based on total sales 223 (e.g., an aggregate value) being less than a predetermined value. In some embodiments, total sales 223 may be reset when a communication link to the cloud computing environment is reestablished.

As a further example, an application running on mobile device 101 (shown in FIG. 1) may determine that mobile device 101 is outside transaction zone 214. The application may evaluate and authorize an offline payment request based on MCC 222 and amount 210. An offline payment request may be authorized based on any suitable combination of payment attributes 201.

Figure 3:
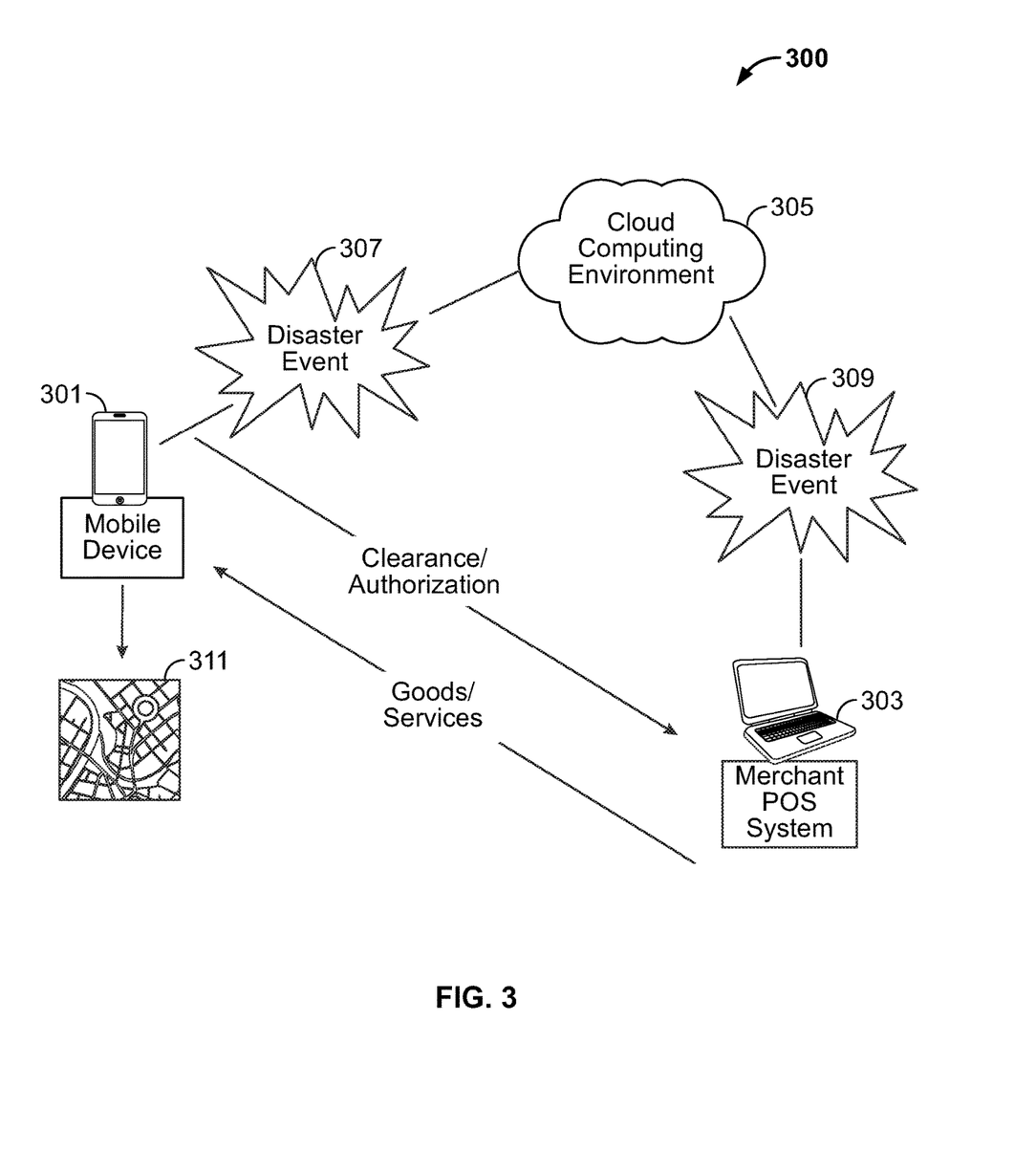
FIG. 3 shows an illustrative system and scenario in accordance with principles of the disclosure.

FIG. 3 shows illustrative system and scenario 300. In FIG. 3, disaster event 307 may disrupt communication between mobile device 301 and cloud computing environment 305. Mobile device 301 may include one or more features of mobile device 101 (shown in FIG. 1). Cloud computing environment 305 may include one or more features of cloud computing environment 105 (shown in FIG. 1). Merchant POS system 303 may include one or more features of merchant POS system 103 (shown in FIG. 1).

Disaster events 307 and 309 may disrupt communication between merchant POS system 303 and cloud computing environment 305. Due to disaster events 307 and 309, mobile device 301 and merchant POS system may not be able to receive authorization for a payment request. FIG. 3 shows that mobile device 301 may attempt to authorize an offline payment request using transaction map 311. Mobile device 301 may utilize attributes included in transaction map 311 to determine whether to authorize an offline payment request. Transaction map 311 may be generated based on payment attributes such as payment attributes 201 (shown in FIG. 2).

FIG. 3 shows that mobile device 301 may communicate directly with merchant POS system 303 and bypass cloud computing environment 305. Mobile device 301 may communication with merchant POS system using any suitable communication method and associated protocols. Illustrative methods may include near field communication, Bluetooth and Wi-Fi.

Based on transaction map 311, mobile device 301 may provide an authorization decision to merchant POS system 303. The authorization decision may include approval for an offline payment. Approval provided by mobile device 301 may be issued on behalf of the issuer, acquirer or transaction processing network. An authorization decision may include a denial, on behalf of the issuer, acquirer or transaction processing network, for the offline payment request.

In response to receiving approval of an offline payment request, merchant POS system 303 may release goods to mobile device 301, or a customer in possession of mobile device 301.

Figure 4:
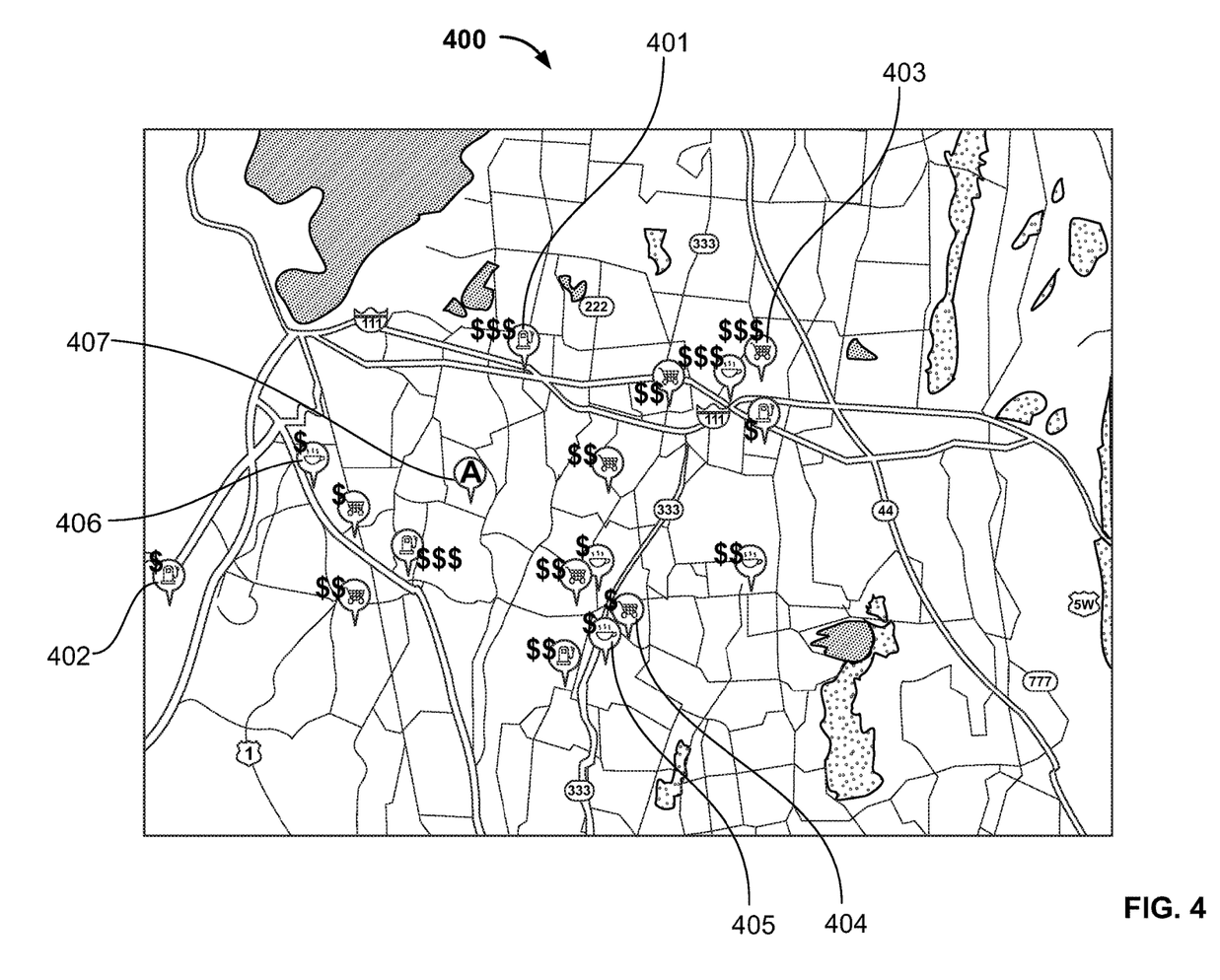
FIG. 4 shows an illustrative transaction map in accordance with principles of the disclosure.

FIG. 4 shows illustrative transaction map 400. Transaction map 400 may be generated based on payment attributes associated with a plurality of payment requests. Illustrative payment attributes are shown in FIG. 2 and Table 1. Transaction map 400 may be generated by a cloud computing environment and pushed to a mobile device or merchant POS system. Transaction map 400 may be updated when a mobile device or merchant POS system connects to the cloud computing environment.

When a mobile device or merchant POS system is unable to connect to the cloud computing environment, transaction map 400 may be used to authorize an offline payment request. For example, transaction map 400 shows illustrative electronic payments associated with customer purchases. Transaction map 400 shows fuel purchase 401. Fuel purchase 401 is associated with "$$$," signifying a value of fuel purchase 401 was greater than a value of fuel purchase 402. Transaction map 400 includes multiple fuel purchases associated with a range of values within a distance of customer's home address 407.

An application running on the customer's mobile device may determine whether to authorize an offline payment request associated with a fuel purchase based on transaction map 400. The application may determine whether the offline payment is associated with a merchant that corresponds to one ore more attributes included in transaction map 400. The application may determine, based on transaction map 400 whether the offline payment request is associated with a merchant that provides a high frequency staple good.

The application may determine whether the offline payment request is associated with an amount less than an average amount associated with the merchant. Based on transaction map 400, the application may determine whether an offline payment is within a comfort zone. A comfort zone may be determined based on a density and average values of payment requests included in transaction map 400 and within a predetermined distance of customer's home address 407.

Transaction map 400 also shows illustrative payment requests for dining purchases 405 and 406. Dining purchase 405 and 406 are each associated with "$," indicating that an average value of each dining purchase was about the same and are less than fuel purchase 401. A dining purchase may be classified as "dining" based on an MCC associated with a merchant.

Transaction map 400 also shows illustrative grocery purchases 403 and 404. A grocery purchase may be classified as "grocery" based on an MCC associated with a merchant. Grocery purchase 403 may be associated with a different merchant than the merchant associated with grocery purchase 403.

Based on transaction map 400, authorization of an offline payment request at the merchant location associated with grocery purchase 403 may be approved for a value up to "$$$." Based on transaction map 400, authorization of an offline payment request at the merchant location association with grocery purchase 404 may only be approved for a value up to "$."

Figure 5:
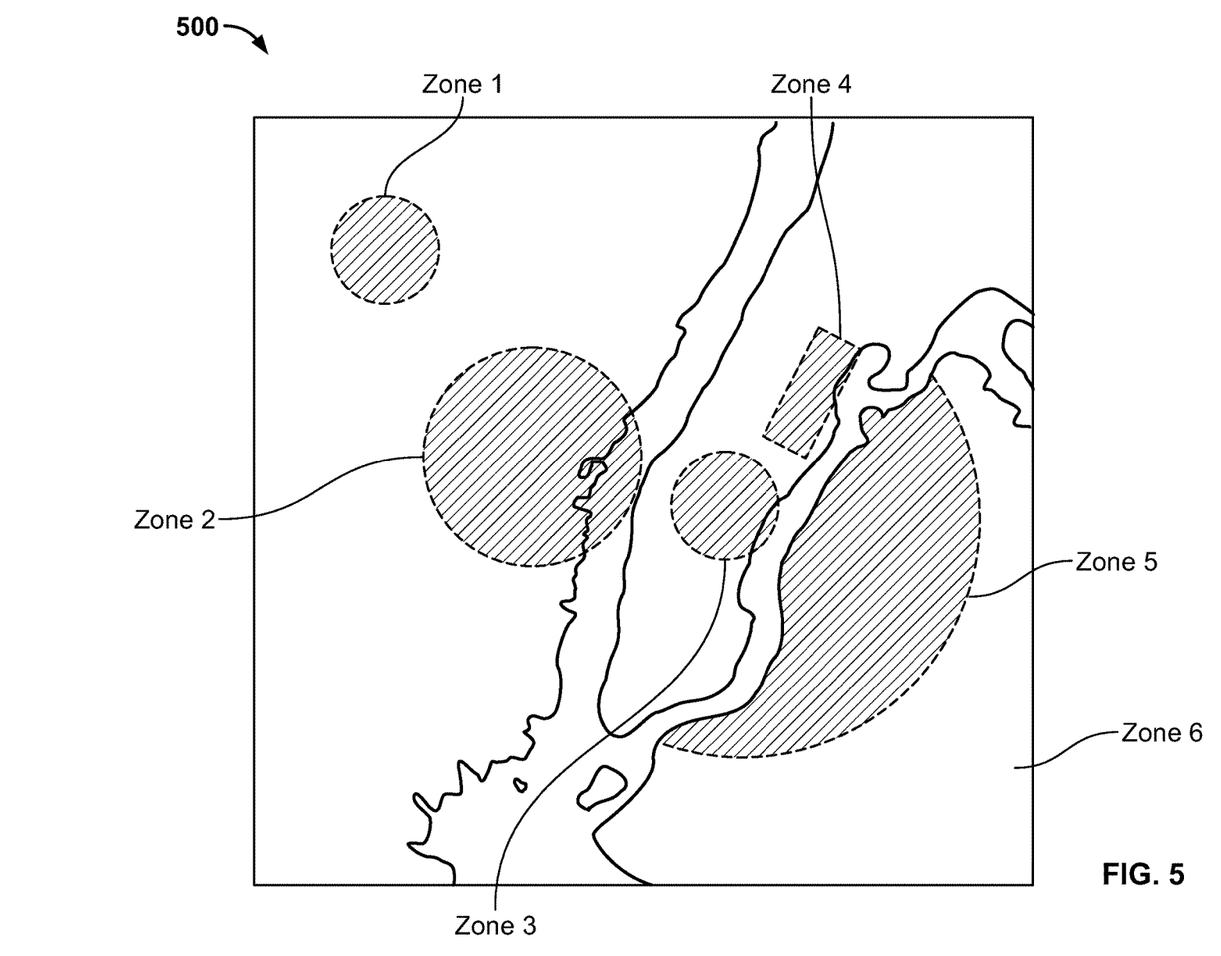
FIG. 5 shows illustrative transaction maps in accordance with principles of the disclosure.

FIG. 5 shows illustrative transaction zones 500. Transaction zones 500 include zones 1-6. A transaction zone may be determined based on a transaction density—a threshold number of payment requests within a boundary that radiates a defined distance from a known location. Illustrative known locations may include home, work, school or a location passed while travelling between two known locations.

Each of zones 1-6 may be used to determine whether to authorize offline payment requests within or outside of a zone. A zone may be defined based on payment attributes relevant to each zone and generated based on payment requests that occur within each zone. For example, a customer may purchase certain goods such as household items closer to home.

Each zone may be defined by a distance from a point, a geometric shape, natural landmarks or any suitable method of demarcation. An area or size of each region may be determined based on a correlation between one or more attributes generated within an encompassing zone such as zone 6.

Each zone may be associated with a transaction map for authorizing offline payment requests within the zone. An application on a customer' mobile device may reference payment attributes associated with a zone where the customer is currently located. The mobile device may include a collection of transaction maps for each zone. Transaction map(s) associated with a zone may be dynamically updated as the mobile device moves from one zone to another.

A zone may be classified as a "known" zone. Offline payments in a known zone may be subject fewer limits than offline payment requests in an "unknown" region. A zone may be classified as an "unknown" zone when a transaction map for that zone includes less attributes than transaction maps for a known zone. An unknown zone may be determined by being associated with less than a threshold number of payment requests or attributes.

Offline payments in an unknown zone may only be approved if they meet restricted criteria. A restriction may include only approving offline payments for low cost, high frequency staple goods. In FIG. 5, zone 6 may be an unknown zone.

Figure 6:
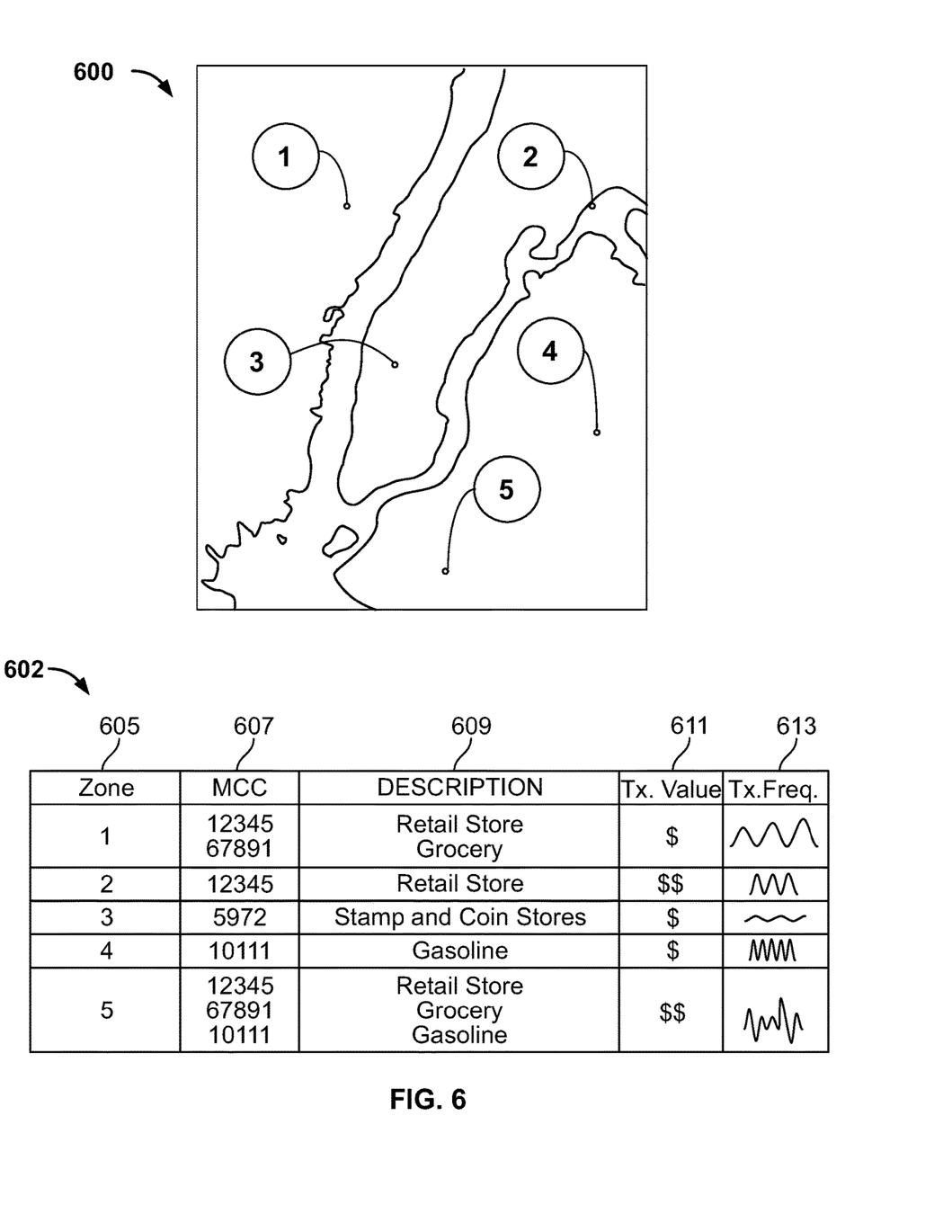
FIG. 6 shows an illustrative transaction map and associated payment attributes in accordance with principles of the disclosure.

FIG. 6 shown illustrative payment attributes 602 associated with payment requests 600 that occurred within zones 1-6 (shown in FIG. 5). A transaction map for a zone may include payment attributes like those shown in 602 for multiple payment requests in the zone. An application on a mobile device may determine whether to approve an offline payment based on the attributes included in a transaction map stored on the mobile device.

Payment attribute 602 shows that each payment request is associated with zone 605. Payment attribute 602 shows that each payment request is associated with MCC categorization 607. Payment attribute 602 shows that each payment request is associated with description 609. Payment attribute 602 shows that each payment request is associated with transaction value 611. Payment attribute 602 shows that each payment request is associated with transaction frequency 613.

When evaluating whether to approve an offline payment request, attributes of the offline payment may be correlated to attributes of a relevant transaction map. A transaction map may be relevant based on a location associated with the offline payment, an amount of the offline request or any other suitable payment attribute of the offline payment.

For example, attributes 602 for zone 1 show a low value (611) payment request that occurs with regular frequency (613). An offline payment in zone 1 may be approved when it is for a low value amount. On the other hand, attributes 602 for zone 3 shows a low value (611) payment request that occurs infrequently (613) at a merchant having MCC 5972 (607). An offline payment request in any region associated with MCC 5972 may be denied or require additional information. Such additional information may include a biometric authentication using a mobile device before being approved.

Figure 7:
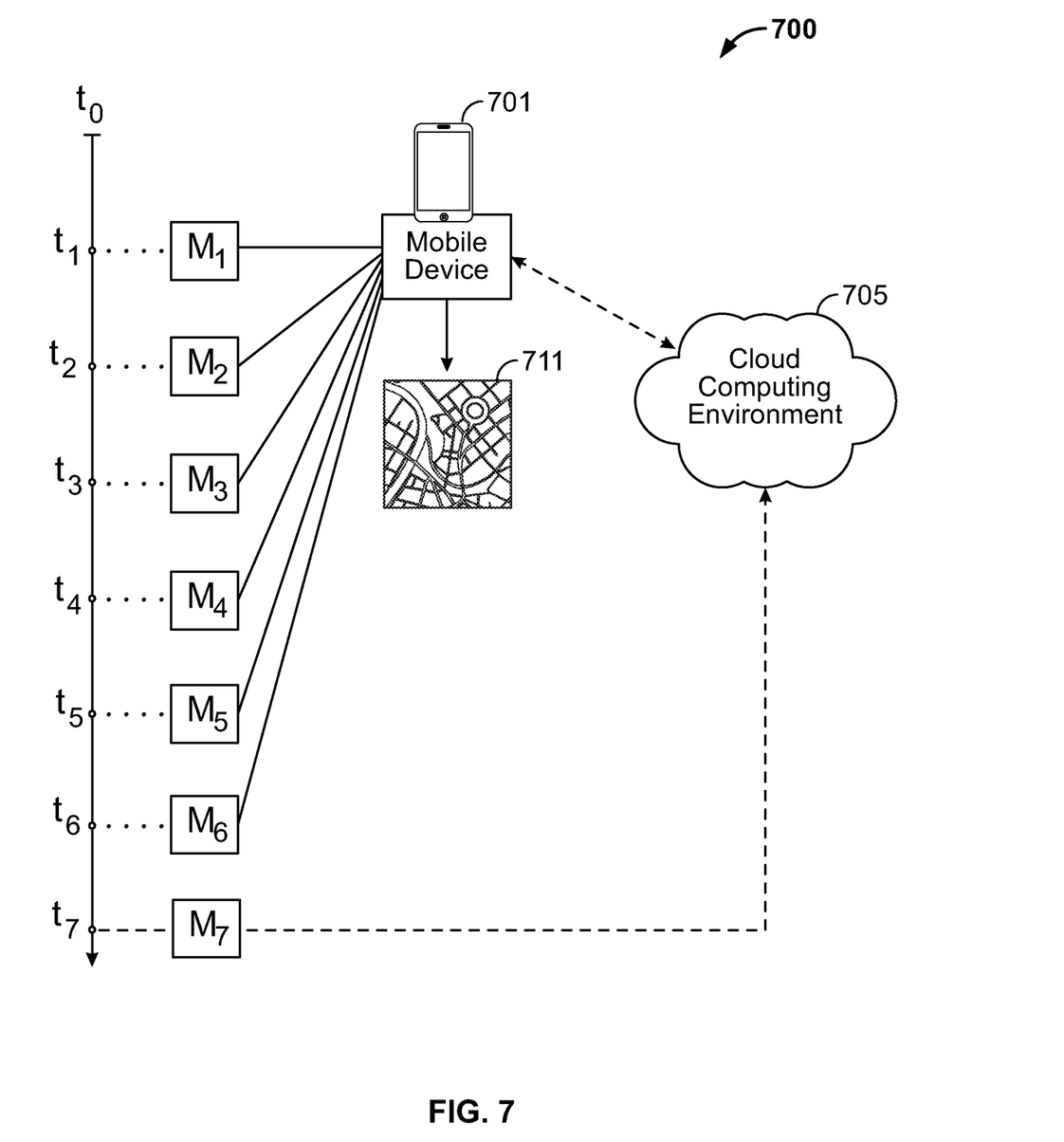
FIG. 7 shows an illustrative system and scenario in accordance with principles of the disclosure.

FIG. 7 shows illustrative scenario 700. Scenario 700 shows multiple offline payment requests $M_1$-$M_6$ received at times $t_0$-$t_6$. Each payment request $M_1$-$M_6$ may be associated with a different merchant and may be associated with its own payment attributes. Each offline payment may be approved or denied based on information associated with transaction map 711.

Scenario 700 shows that at $t_7$, payment request $M_7$ is successfully communicated to cloud computing environment 705. Authorization for payment request $M_7$ may be provided by cloud computing environment 705. When communication is established with cloud computing environment 705, cloud computing environment 705 may communicate with mobile device 701 and update transaction map 711. When communication is established with cloud computing environment 705, mobile device 701 may update cloud computing environment 705 with payment attributes and authorization decisions for offline payment requests $M_1$-$M_6$.

Thus, apparatus and methods for MOBILE ELECTRONIC WALLET SYSTEM are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A mobile electronic wallet system comprising:
   a cloud computing environment that:
      receives a plurality of payment requests from a target customer for payment to a plurality of merchants;
      authorizes the plurality of payment requests; and
      debits corresponding target customer accounts corresponding amounts corresponding to the plurality of payment requests;
   an application running on a mobile device of the target customer that:
      stores locally, on the mobile device, an encrypted dynamic transaction map machine-learning generated by the cloud computing environment and comprising one or more payment attributes and limits associated with a target geographical location, wherein the one or more payment attributes and limits are generated and based at least on the plurality of payment requests by the target customer previously authorized by the cloud computing environment;
      initiates a target payment request for a product from a target merchant which is not among the plurality of merchants associated with any of the plurality of payment requests previously authorized by the cloud computing environment;
      receives a signal from a point of sale terminal of the target merchant that a first connection to the cloud computing environment is not accessible by the target merchant;
      fails to establish, within a predetermined time window, a second connection from the mobile device to the cloud computing environment;
      transmits the target payment request to the target merchant using a near field communication ("NFC") link and bypasses the cloud computing environment;
      instructs the target merchant not to await receipt of an online authorization response from the cloud computing environment;
      assumes authority for evaluation of the target payment request, and evaluates and generates an offline authorization of the target payment request based on the encrypted dynamic transaction map previously generated and stored locally on the mobile device;
      transmits an offline payment for the product to the target merchant based on the offline authorization; and
      instructs the target merchant to release the product to the target customer without receiving the online authorization response from the cloud computing environment;
   wherein the encrypted dynamic transaction map is updated by the cloud computing environment over time as the mobile device moves from one target geographical location to another and the encrypted dynamic transaction map is updated before failing to establish the second connection from the mobile device to the cloud computing environment or receiving the signal from the point of sale terminal of the target merchant that the first connection to the cloud computing environment is not accessible by the target merchant.

2. The mobile electronic wallet system of claim 1, wherein the encrypted dynamic transaction map defines a transaction zone boundary that radiates a defined distance from a location associated with an authorized payment request.

3. The mobile electronic wallet system of claim 2, wherein, the application running on the mobile device authorizes the target payment request based on a location of the mobile device being within the transaction zone boundary.

4. The mobile electronic wallet system of claim 2, wherein, the application running on the mobile device authorizes the target payment request based on a value of the target payment request being within a predetermined range of payment values included in the encrypted dynamic transaction map.

5. The mobile electronic wallet system of claim 1, wherein the application running on the mobile device authorizes a plurality of target payment requests that, in an aggregate value, are less than a predetermined value, based on the encrypted dynamic transaction map.

6. The mobile electronic wallet system of claim 5, wherein the application running on the mobile device resets the aggregate value when the mobile device is able to reestablish the second connection to the cloud computing environment.

7. The mobile electronic wallet system of claim 1, wherein the application running on the mobile device:
   determines that the mobile device is outside a geographic area associated with the encrypted dynamic transaction map; and
   evaluates and authorizes the target payment request based on an identification of the target merchant associated with the target payment request and a value of the target payment request.

8. A method for securing a later payment request initiated by a mobile device at a target merchant, the method comprising:
   during a first time period:
      receiving a plurality of payment requests from the mobile device for payment to a plurality of merchants;
      offloading a processing of the plurality of payment requests to a cloud computing environment in response to the mobile device establishing a communication pathway with the cloud computing environment;
      downloading a dynamic transaction map from the cloud computing environment in response to the mobile device establishing the communication pathway with the cloud computing environment, wherein the transaction map comprises one or more payment attributes and limits generated based on historical payment requests initiated by the mobile device and authorized by the cloud computing environment over a pre-determined time period and one or more machine learning algorithms and dynamically updated with the plurality of payment requests; and
      storing the transaction map locally on the mobile device; and
   during a second period of time that occurs after the first time period:
      authorizing the later payment request from the target merchant as an offline payment based on the transaction map in response to the mobile device being unable to establish a communication pathway with the cloud computing environment within a predetermined time window; and
      after authorizing the later payment request as the offline payment, transmitting, from the mobile device to a point-of-sale terminal belonging to the target merchant, payment for a product;
wherein the target merchant is not included in the plurality of merchants associated with any of the plurality of payment requests authorized by the cloud computing environment during the first time period.

9. The method of claim 8 further comprising, updating the transaction map based on a current geographic location of the mobile device.

10. The method of claim 8, the processing of the later payment request based on the transaction map comprising:
   when the target merchant corresponds to an attribute in the transaction map, authorizing the later payment request based on the transaction map; and
   when the target merchant does not correspond to the attribute, authorizing the payment request based on the transaction map and in response to detecting that:
      the target merchant provides a high frequency staple good; and
      an amount associated with the payment request is less than a limit associated with the target merchant.

11. The method of claim 10, wherein the high frequency staple good is determined based on a threshold number of attributes in the transaction map.

12. The method of claim 10, wherein the high frequency staple good is determined based on a listing of merchants downloaded when the mobile device establishes the communication pathway with the cloud computing environment;
   wherein, the listing of merchants is stored locally on the mobile device.

13. The method of claim 8, further comprising, suspending authorizations based on the transaction map in response to the mobile device being unable to establish the communication pathway with the cloud computing environment for a predetermined amount of time.

14. The method of claim 8, further comprising, when an aggregate value of payment requests authorized based on the transaction map exceeds a predetermined value, suspending authorizations based on the transaction map.

15. A mobile electronic wallet system comprising:
   a cloud computing environment that receives and authorizes payment requests from a customer; and
   a software application running on a customer's mobile device that:
      determines whether the cloud computing environment is accessible by the customer's mobile device;
      when the cloud computing environment is accessible by the customer's mobile device, allows the cloud computing environment to authorize a payment request from the customer at a target merchant; and
      when the cloud computing environment is not accessible by the customer's mobile device within a threshold time window, authorizes the payment request as an offline payment based on a dynamic transaction map stored locally on the customer's mobile device and transmits the offline payment to the target merchant;
wherein the dynamic transaction map comprises one or more payment attributes and limits generated based on historical payment requests from a plurality of merchants associated with one or more payment requests authorized by the cloud computing environment, and the target merchant is not associated with any of the one or more payment requests authorized by the cloud computing environment.

16. The system of claim 15, wherein the dynamic transaction map is further generated based on historical payment requests initiated by the customer's mobile device and a location of the customer's mobile device when initiating the historical payment requests.

17. The system of claim 15, wherein the software application imposes a time based limit on how many payment requests may be authorized based on the dynamic transaction map.

18. The system of claim 15, wherein the software application updates the dynamic transaction map based on a location of the customer's mobile device.

19. The system of claim 15, wherein based on the dynamic transaction map, the software application hardens an authorization decision of the payment request by the cloud computing environment.

* * * * *